United States Patent [19]

Manchester, Jr. et al.

[11] 4,290,632
[45] Sep. 22, 1981

[54] APPARATUS FOR CONNECTING TOGETHER FLOWLINE END PORTIONS

[76] Inventors: Luther L. Manchester, Jr., 810 Woodstock, Bellaire, Tex. 77401; Bobby J. Reneau, 15527 Morales, Houston, Tex. 77032

[21] Appl. No.: 184,041

[22] Filed: Sep. 4, 1980

Related U.S. Application Data

[63] Continuation of Ser. No. 1,758, Jan. 8, 1979, abandoned.

[51] Int. Cl.³ .............................................. F16L 21/06
[52] U.S. Cl. ..................................... 285/323; 285/93; 285/94; 285/15; 285/348
[58] Field of Search ................... 285/18, 96, 322, 323, 285/DIG. 21, 39, 34 L, 15, 93, 94, 348

[56] References Cited

U.S. PATENT DOCUMENTS

| | | | |
|---|---|---|---|
| 3,695,634 | 10/1972 | White | 285/322 X |
| 3,704,033 | 11/1972 | Arnold | 285/322 X |
| 3,713,675 | 1/1973 | White | 285/322 X |
| 4,006,921 | 2/1977 | Mohr | 285/343 X |
| 4,109,945 | 8/1978 | Manchester et al. | 285/93 |

Primary Examiner—Dave W. Arola

Attorney, Agent, or Firm—Pravel, Gambrell, Hewitt, Kirk, Kimball & Dodge

[57] ABSTRACT

A grip-seal apparatus for connecting together flowline end portions having first and second housings having alignable bores therethrough, with gripper member mounted in the first housing for moving radially inwardly into gripping engagement with the first flowline member. A sealing assembly is mounted with the second housing for moving radially inwardly into sealing engagement with the first flowline member. An activating sleeve mounted in the second housing and with the gripper members moves longitudinally into engagement with the gripper members and the sealing assembly. Fasteners with the activating sleeve fasten the first and second housings therewith resulting in the longitudinal movement of the activating sleeve with respect to the gripper members and the sealing assembly, with such action resulting in the gripper members moving radially inwardly into a gripping engagement with the first flowline member and the sealing assembly moving radially inwardly into sealing engagement with the first flowline member. Connection members with the second housing connect the second housing with the second flowline member in order to reestablish fluid flow between the first and second flowline members.

13 Claims, 1 Drawing Figure

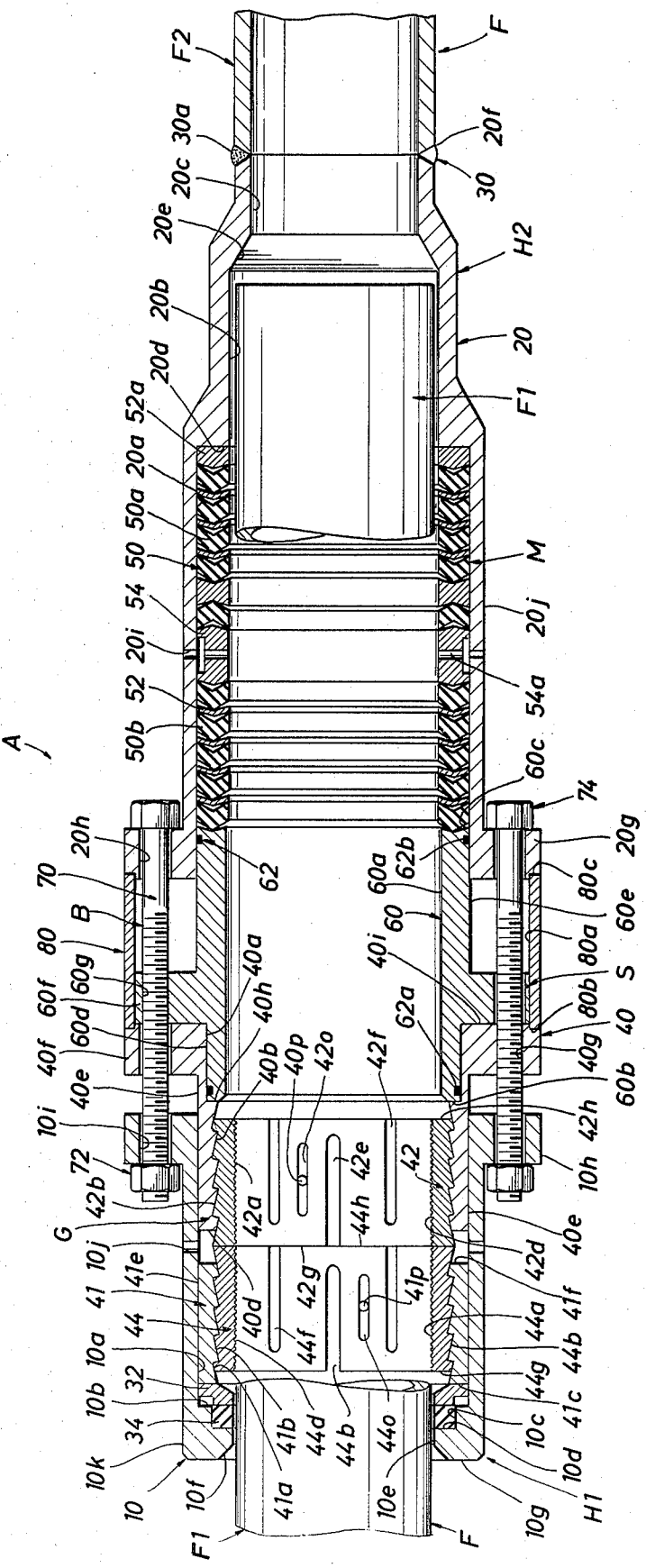

APPARATUS FOR CONNECTING TOGETHER FLOWLINE END PORTIONS

This is a continuation, of application Ser. No. 1,758, filed Jan. 8, 1979, and now abandoned.

TECHNICAL FIELD

The field of this invention relates to the connection together of first and second tubular members for fluid flow therebetween after a damaged portion thereof has been removed and in particular, to the reestablishment of a connection between the severed portions of an underwater pipeline.

PRIOR ART

Typically, in making repairs for an underwater pipeline, it is necessary to remove a damaged section and replace that section with a new, undamaged pipeline section. Such a replacement requires underwater welding, which is extremely time consuming and a technically difficult task. Various coupling devices have been developed to eliminate the need for such underwater welding procedures.

Such devices include such a device as disclosed in U.S. Pat. No. 4,109,945 to the instant inventors. However, a large number of nuts and bolts must be operably engaged for proper operation thereof. For example, one set of bolts are necessary for operation of the gripping structure of U.S. Pat. No. 4,109,945, while another set of fasteners are required to operate the sealing portion thereof. The additional time necessary for operation of both sets of fasteners further increases the time necessary for a diver, who may be working at great depths, to remain at such depths to effectuate the pipeline repair; for, the greater the depths worked at, the more difficult the working conditions are for the divers for the accurate installation of a coupling device for connecting together the undamaged portions of the pipeline. Furthermore, in addition to the multiplicity of fasteners involved, there is accordingly a more complex, mechanical structure necessary to accomplish the result of connecting together flowline end portions in a proper sealable relation.

SUMMARY OF THE INVENTION

It is an object of this invention to provide a new and improved grip-seal apparatus for insertion between the severed end portions of a damaged underwater pipeline, having had the damaged section removed, with the apparatus of the present invention connecting the severed end portions together underwater inspite of some unpredictability being present in the actual size, roundness, and surface integrity of the pipe end portions.

It is a further object of this invention to provide a new and useful mechanically less complex apparatus for connecting together flowline end portions.

These object and other objects of this invention are set out in greater detail in the description to follow and should not be interpreted as being anything more than a mere summary of the objects of this invention. These objects and other objects of this invention are carried out by the grip-seal apparatus of the preferred embodiment of this invention for connecting together first and second flowline end portions for fluid flow therebetween. Such a grip-seal apparatus includes first and second housings having alignable bores therethrough for at least partially receiving the first flowline end portion. Gripper members are mountable in the first housing bore for moving radially inwardly into gripping engagement with the first flowline member. A sealing assembly is mounted in the second housing bore for movement radially inwardly into sealing engagement with the first flowline member. An activating sleeve is mounted in the second housing bore and in the bore of the gripper members for longitudinal movement into engagement with the gripper members and the sealing assembly. Fastening means with the activating sleeve fastens the first and second housings therewith resulting in longitudinal movement of the activating sleeve with respect to the gripper members and the sealing assembly for radially inward movement of the gripper members into gripping engagement with the first flowline member and radially the inwardly movement of the sealing assembly into sealing engagement with the first flowline member.

BRIEF DESCRIPTION OF THE DRAWING

FIG. 1 is a sectional, elevational view of the grip-seal apparatus of the preferred embodiment of the present invention.

DESCRIPTION OF THE PREFERRED EMBODIMENT

Referring to the drawings, the letter F designates generally a flowline or a pipeline which is located underwater. Such flowline F for any number of reasons may have a damaged area that must be removed, requiring the replacement of such a damaged area. Accordingly, the flowline F must be severed into a first flowline member F1 and a second flowline member F2, which must accordingly thereafter be reconnected together for transferring fluids, such as oil or gas, through the pipeline F. The grip-seal apparatus A of the present invention is adapted to be connected in the flowline F to reconnect the fluid flow through the first flowline member F1 that has been severed from second flowline member F2. Unless otherwise specified, it is preferred that the components of the grip-seal apparatus A of the present invention preferably be formed of steel or other suitable high-strength materials capable of taking the heavy stresses and strains typically incumbent upon such an apparatus A when operating in its intended conditions and environment.

The grip-seal apparatus A includes a first housing designated generally as H1 for receiving the first flowline member F1 therein. The first housing H1 includes housing 10 which is a hollow, cylindrical member having a bore generally designated as 10a extending therethrough and adapted to receive one end of the severed flowline F such as flowline member F1. The housing 10 has a radial lip 10b formed adjacent to bore 10a with an annular surface 10c formed adjacent to radial lip 10b and radial lip 10d formed adjacent annular surface 10c. Inner annular surface 10e is formed adjacent radial lip 10d with tapered surface 10f formed adjacent inner annular surface 10e, with the tapered surface 10f formed adjacent end surface 10g of the housing 10. At the opposite end of the housing 10 adjacent the bore 10a, a radial flange 10h is formed having a plurality of circumferentially spaced openings such as 10i formed therein. Preferably a suitable vent 10j is formed between the bore 10a and outer surface 10k of the housing 10 for filling with a protective oil or lubricant such as grease or the like to protect the gripper means G of the present invention as described more fully hereinbelow.

The second housing H2 includes housing 20 having longitudinally aligned bores 20a, 20b, 20c of differing diameters, with a radial lip 20d separating bores 20a, 20b and annular tapered surface 20e separating bores 20b, 20c and end surface 20f formed adjacent bore 20c. A radial flange 20g is formed adjacent to bore 20a having a plurality of circumferentially spaced openings 20h based thereabout the radial flange 20g. It is preferred that the bore 20c be substantially the same diameter as the inside diameter of the flowline F and that the diameter of the bore 20b be substantially the same as the outside diameter of the flowline F for partially receiving the first flowline member F1 therein. Preferably a suitable vent opening 20i is formed between the bore 20a and the outer surface 20j of housing 20.

Connector means designated generally by the number 30 are provided at the outer end of the second housing 20 adjacent end surface 20f for connecting the housing 20 to second flowline member F2. The connector means 30 may include weldments 30a or may be of a ball joint flange connection, a straight flange, a ball joint utilizing connection with a pipeline spool, or any other suitable connection means 30 for connecting the second flowline member F2 directly with the second housing H2 with such various types of connector means 30 being detailed more particularly in U.S. Pat. No. 4,109,945.

The grip-seal apparatus A further includes gripper means designated generally as G. The gripper means G includes grippers 40, 41 having bores 40a, 41a formed therethrough. Gripper camming surfaces 40b, 41b are formed adjacent bores 40a, 41a of grippers 40, 41 with end surface 41c formed adjacent gripper camming surface 41b. Outer annular surface 40e extends from the radial end surface 40d to radial flange 40f, with the radial flange 40f having a plurality of circumferentially spaced openings 40g formed therein. Outer annular surface 41e extends between end surface 41c and end surface 41f. Preferably, all of such openings 40g are threaded with the exception of four thereof as more fully discussed hereinbelow. Radial lip 40h is formed between bore 40a and gripper camming surface 40b. The radial flange 40f of gripper 40 includes an end surface 40i.

The gripper means G further includes actuator sleeves 42, 44 which are preferably of a single piece collet type and of a cylindrical configuration having bores 42a, 44a, respectively, formed therein. A plurality of camming surfaces 42b, 44b are formed with the outer annular surface of the actuator sleeves 42, 44 and are adapted to operably engage gripper camming surfaces 40b, 41b, respectively. Camming surfaces 40b, 42b extend stepwise in a thread-like radially outwardly fashion from radial lip 40h to end surface 40d while camming surfaces 41b, 44b extend stepwise in a thread-like configuration from radial lip 41f to end surface 41c. It should be noted that the camming surfaces 40b, 42b, 41b, 44b preferably are formed in a spiral fashion with the such camming surfaces spiraled to compliment one another for complimentary engagement therebetween for appropriate wedging surface action as discussed more fully hereinbelow. Such camming surfaces 40b, 41b, 42b, 44b comprise the camming means of the present invention.

The actuator sleeves 42, 44 further include a plurality of gripping surfaces 42d, 44d formed within bores 42a, 44a of the actuator sleeves 42, 44. Preferably the gripping surfaces 42d, 44d are formed in a spiraling fashion, with the spiral thereof corresponding with the spiral configuration of the camming surfaces 42b, 44b adjacent thereto, however being of a smaller pitch between adjacent spirals. Furthermore, the actuator sleeves 42, 44 include a plurality of circumferentially spaced slots 42e, 42f, 44e, 44f with the circumferentially spaced, longitudinally extending slots 42e extending from end surface 42g inwardly toward end surface 42h and slots 42f extending inwardly from end surface 42h inwardly toward end surface 42g. Slots 44e, 44f are similarly formed. The slots 42e, 42f, 44e, 44f, respectively, may overlap, if desired and cooperate to make the actuator sleeves 42, 44 radially compressible. Elongate slots 42o, 44o are preferably formed with sleeves 42, 44 and receive appropriate pins 40p, 41p formed with grippers 40, 41 for allowing longitudinal movement along the slots 42o, 44o, but no rotational movement therebetween. Preferably, each sleeve is formed having two pairs of slots 42o, 44o being horizontally opposed and pins 40p, 41p are appropriately paired therewith.

The grip-seal apparatus A of the present invention further includes sealing means M mounted in the second housing H2 for movement radially inwardly into sealing engagement with the flowline F such as with first flowline member F1. The sealing means M includes a plurality of seals 50 adapted to be mounted in bore 20a of housing 20. Preferably the seals 50 include a plurality of seals 50a, 50b separated individually by a plurality of backup rings 52, with the backup rings 52 separating each individual seal 50a, 50b from one another. Furthermore, preferably a lantern ring 54 is centrally mounted within the sealing means M to separate groups of seal designated generally as 50a, 50b. Further, the lantern ring 54 has an opening 54a forward therein and adapted to communicate with vent opening 20i for hydraulically determining leakage, if any, therebetween. Preferably, backup ring 52a abuts radial lip 20d of housing 20 with an appropriate seal 50a positioned adjacent thereto, with an appropriate number of backup rings 52 and seals 50a thereafter disposed within the bore 20a. The lantern ring 54 secures such seals 50 and backup rings 52 appropriately in place, with an additional plurality of seals 50b and backup rings 52 being disposed therein bore 20a. The sealing means M is mounted in housing 20 for movement radially inwardly into sealing engagement with the first flowline member F1 and radially outwardly into engagement with bore 20a of housing 20 as described more fully hereinbelow.

The grip-seal apparatus A of the present invention further includes an activating sleeve S. The activating sleeve S includes activating sleeve 60 having a bore 60a formed therethrough, with substantially radial end surfaces 60b, 60c formed adjacent each end of the bore 60a, with outer annular surfaces 60d, 60e formed adjacent radial end surfaces 60b, 60c, respectively, with radial flange 60f formed therebetween outer annular surfaces 60d, 60e. Suitable circumferentially spaced openings 60g are preferably formed about the radial flange 60f of the activating sleeve 60. Preferably, only four of such openings 60g are threaded as discussed below. It is preferred that a some of such openings 60g be threaded as discussed more fully hereinbelow. The activating sleeve 60 is adapted to be mounted such that the radial flange 60f may abut end surface 40i of gripper 40 with annular surface 60d in engagement with bore 40a and radial end surface 60b in engagement with radial end surface 40h of gripper 40. As such, there may be positive surface contact between the gripper 40 and activating sleeve 60. Furthermore, it is preferred that the outer annular surface 60e be adapted to be disposed within bore 20a of housing 20 with radial end surface 60c abutting the sealing means M. Suitable anti-leakage means designated generally 62 is preferably mounted with the activating sleeve 60 to prevent fluid migration between the activating sleeve 60 and the gripper 40, as well as between the activating sleeve 60 and the housing 20. The anti-leakage means 62 may include suitable seals such as O-rings 62a, 62b or any other suitable seal, with O-ring 62a disposed between annular surface 60d of the activating sleeve 60 and bore 40a of the gripper 40 and O-ring 62b disposed between annular surface 60e of activating sleeve 60 and bore 20a of housing 20 for preventing such fluid leaking. Thus, the activating sleeve 60 is mounted with the second housing H2 and the gripper means G for longitudinal movement into engagement with the gripper means G and sealing means M.

The grip-seal apparatus A of the present invention further includes fastening means B with the activating sleeve S for fastening the first and second housings H1, H2 therewith, resulting in longitudinal movement of the activating sleeve S with respect to the gripper means G and sealing means M. Preferably the fastening means B includes threaded shafts 70 some of which are adapted to threadedly engage a portion of the openings 40g, 60g that are similarily so threaded. It should be noted that not all such openings 40g, 60g are threaded; however, to the extent that those that are threaded, that such threads would be compatible with the threads on threaded shafts 70. It is preferred that the threaded shafts 70 be of sufficient length to extend an appropriate length from the flange 60f of the activating sleeve 60 to beyond flange 10h of housing 10 and in the opposing direction, to beyond flange 20g of housing 20. It is preferred that openings 10i, 20h, 40g, and 60g be aligned with one another such that the threaded shaft 70 may extend through all such openings when in such longitudinal alignment. The threaded shafts 70 are adapted to receive an appropriate nut 72 or be formed with bolt head 74.

The grip-seal apparatus A of the present invention further includes a spacer sleeve 80 having a bore 80a formed therethrough with the spacer sleeve bore 80a adapted to receive the flange 60f of the activating sleeve 60 therein. Furthermore, it is preferred that the spacer sleeve 80 be formed with end surfaces 80b, 80c. End surface 80b abuts flange 40f of gripper 40 and end surface 80c abuts flange 20g of housing 20. The spacer sleeve 80 is for insuring proper spacing between the gripper 40 and housing 20 as described more fully hereinbelow.

In the operation of the grip-seal apparatus A of the present invention, the first flowline member F1 of the severed flowline F is inserted into first housing H1 through water seal 34. The water seal 34 acts to scrape a variety of debris from the first flowline member F1 as it is inserted into the grip-seal apparatus A of the present invention. Flowline member F1 is inserted into first housing H1, therethrough activating sleeve S, thereinto second housing H2 with the sealing means M disposed therebetween the activating sleeve S and second housing H2. The fastening means B is mounted with the activating sleeve S for fastening the first and second housings H1, H2 with the activating sleeve S. The fastening means B results in the longitudinal movement of the activating sleeve S with respect to the gripper means G and the sealing means M. The longitudinal movement of the activating sleeve S relative to the gripper means G moves the gripper means G radially inwardly into gripping engagement with the first flowline member F1. The longitudinal movement of the activating sleeve S relative to the sealing means M moves the sealing means M radially inwardly into sealing engagement with the first flowline member F1. Vent opening 20i is used to hydraulically test the sealing means M to insure a positive sealing relation before operating the flowline F.

More particularly, as the nuts 72 are threaded onto shafts 70, the housing 10 is drawn towards the activating sleeve S and gripper means G. As the housing 10 moves toward the activating sleeve S, the water seal compression ring 32 abuts radial lip 10b of housing 10 and water seal 34, resulting in radial expansion thereof into a sealable relation with flowline member F1. As such movement is taking place, camming surfaces 40b, 41b and camming surfaces 42b, 44b 42c of the camming means of the present invention are consequently working in opposite directions and radially compressing inwardly into engagement with the first flowline member F1 for gripping engagement therebetween gripping surfaces 42d, 44d and the outer surface of the first flowline member F1. As such, the camming surfaces 40b, 41b, 42b, 44b coact with one another to force the gripping surfaces 42d, 44d of the actuator sleeves 42, 44 radially inwardly into gripping engagement with the first flowline member F1 in response to the fastening of the fastening means B. Gripper 40 of the gripper means G coacts with actuator sleeve 42 for engagement of the first flowline member F1 for resisting compressive forces while gripper 41 coacts with actuator sleeve 44 for engagement with the first flowline member F1 for resisting tension forces on the apparatus A of the present invention to prevent withdrawal of the flowline member F1 therefrom.

As noted hereinabove, it is preferred that all but four of the openings 40g be threaded while conversely all of the openings 60g are unthreaded, with the exception of four thereof which are threaded. Accordingly, the four threaded openings 60g are suitable for permitting an appropriate packing adjustment of the sealing means M by properly placing the activating sleeve S in proper relation to the housing H2, having the sealing means M disposed therebetween. By fastening action of the nuts 72 on threaded shaft 70, the housing 10 is drawn towards the activating sleeve S for gripping action. Rotation of bolt head 74 within threaded openings 40g results in relative movement of housing 20 with respect activating sleeve 60, resulting in compression of the sealing means M into sealing engagement with the outer surface of first flowline member F1. As is shown, the sealing means M is constrained between the end surface 60c and radial lip 20d of the housing 20, with the seals 50 being compressed in such a fashion that they will expand radially inwardly into engagement with the first flowline member F1 to provide a sealing relation therebetween and radially outwardly to provide a sealing relation therebetween such seals 50 and bore 20a of housing 20. The spacer sleeve 80 insures proper spacing between the gripper 40 and housing 20.

Thus, the grip-seal apparatus A of the present invention is adapted to grip and seal the first flowline member F1 by merely engaging the fastening means B to effectuate these results. With the first flowline member F1 firmly gripped by the gripper means G and sealed with the sealing means M of the present invention, the second flowline member F2 may be connected therewith by second housing connector means 30 for reestablishment of fluid flow therethrough the flowline F.

Thus, the grip-seal apparatus A of the present invention provides a new and useful tool for quickly and effectively reestablishing fluid flow through a flowline F having been severed for removal of a damaged portion thereof. The grip-seal apparatus A provides for the gripping and sealing about the first flowline member F1 for a gripping and sealable engagement therebetween the grip-seal apparatus A and the flowline member F1 for thereafter being reconnected with second flowline member F2 to reestablish flow therethrough.

The foregoing disclosure and description of the invention are illustrative and explanatory thereof, and various changes in the size, shape and material as well as in details of the illustrated construction may be made without departing from the spirit of this invention.

We claim:

1. A grip-seal apparatus for connecting first and second flowline members for fluid flow therethrough, comprising:
   a first housing having a bore therethrough for receiving the first flowline member;
   a second housing having a bore therethrough adapted for partly receiving the first flowline member extending through said first housing bore;
   gripper means having a bore therethrough mounted in said first housing bore for moving radially inwardly into gripping engagement with the first flowline member upon relative axial movement between said first and second housings;
   sealing means mounted in said second housing bore for moving radially inwardly into sealing engagement with the first flowline member;
   said gripper means including a gripper member having a flange portion mounted with said second housing;
   an activating sleeve mounted partly in said gripper member and partly in said second housing bore for axial movement into engagement with said sealing means;
   fastening means including a plurality of threaded shafts extending between said first and second housings, said fastening means cooperating with said flange portion of said gripper member, said activating sleeve, and said first and second housings for fastening said first and second housings together;
   said gripper member being mounted for axial movement relative to said first housing for movement of said gripper means radially inwardly into gripping engagement with the first flowline member;
   said activating sleeve mounted for axial movement relative to said second housing, said fastening means for moving said activating sleeve into engagement with said sealing means for moving said sealing means radially inwardly into sealing engagement with the first flowline member; and,
   second housing connector means with said second housing for connecting said second housing to the second flowline member in order to establish fluid flow between the first and second flowline members.

2. The grip-seal apparatus of claim 1, wherein said gripper means further includes:
   a cylindrical actuator sleeve being mounted within said gripper member, said actuator sleeve having a bore therethrough, said actuator sleeve being mounted within said first housing bore about the first flowline member; and,
   camming means formed with said gripper member for moving said actuator sleeve radially inwardly into gripping engagement with the first flowline member in response to axial movement of said gripper member upon fastening by said fastening means of said first and second housings together.

3. The grip-seal apparatus of claim 2, wherein:
   a plurality of gripper camming surfaces are formed within said gripper member; and,
   said actuator sleeve has a plurality of actuator camming surfaces formed about the exterior surface thereof, said actuator camming surfaces engaging said gripper camming surfaces for interaction therebetween to move said actuator sleeve radially inwardly into gripping engagement with the first flowline member.

4. The grip-seal apparatus of claim 1, wherein:
   said activating sleeve is formed having an activating sleeve radial end surface disposed in said second housing bore for abutting said sealing means for movement radially inwardly thereof into sealing engagement with the first flowline member.

5. The grip-seal apparatus of claim 4, wherein said sealing means includes:
   a plurality of seals mounted in said second housing bore which are radially inwardly compressible into sealing engagement with the first flowline member in response to axial movement of said activating sleeve.

6. The grip-seal apparatus of claim 1, further including:
   anti-leakage means mounted with said activating sleeve to prevent fluid migration between said activating sleeve and said gripper means and between said activating sleeve and said second housing.

7. The grip-seal apparatus of claim 1, further including:
   a spacer sleeve having a bore therethrough;
   said spacer sleeve bore adapted to receiving said activating sleeve therein; and,
   said spacer sleeve mounted in abutting relation with said flange portion of said gripper member and said second housing for insuring proper spacing therebetween.

8. The grip-seal apparatus of claim 1, wherein:
   at least one of said plural threaded shafts is threadedly mounted with said activating sleeve for insuring proper packing adjustment of said sealing means.

9. The grip-seal apparatus of claim 2, wherein:
   said fastening means includes means for moving said gripper member axially relative to said first housing into engagement with said actuator sleeve to cause said actuator sleeve to grip said first flowline member and means for moving said activating sleeve in the opposite axial direction to engage said sealing means to move said sealing means into sealing engagement with said first flowline member.

10. The grip-seal apparatus of claim 1, wherein:
    said fastening means includes means for setting said gripper member into operative engagement with the first flowline member.

11. The grip-seal apparatus of claim 1, including:
    said first and second housings terminating in spaced flange portions, said flange portions being interconnected by said plurality of threaded shafts;

said gripper member flange portion being mounted in alignment with said first and second housing flange portions and having said threaded shafts extending therethrough; and, said threaded shafts cooperating with said flange portions of said first and second housings and said gripper member to move said gripper member and said gripper means into gripping engagement with the first flowline as said threaded shafts connect together said first and second housings.

12. The grip-seal apparatus of claim 11, wherein: said flange portion of said activating sleeve being mounted in alignment with said flanges of said first and second housings and said gripper member and having a second plurality of threaded shafts; and, said second plurality of threaded shafts operably connected to said flange of said activating sleeve and to said flange of said second housing for moving said activating sleeve into engagement with said sealing means.

13. The grip-seal assembly of claim 12, wherein: said second plurality of threaded shafts extend through all of said aforementioned flanges.

* * * * *